(12) United States Patent
van Dalen

(10) Patent No.: US 7,624,148 B2
(45) Date of Patent: Nov. 24, 2009

(54) SYSTEM FOR REMOTE DATA ACQUISITION BASED ON E-MAIL MESSAGE COMMUNICATION THROUGH PUBLIC AND PRIVATE NETWORKS

(75) Inventor: Rutger van Dalen, Nijkerk (NL)

(73) Assignee: Windmill Microsystems Holding BV, Nijkerk (NL)

( * ) Notice: Subject to any disclaimer, the term of this patent is extended or adjusted under 35 U.S.C. 154(b) by 686 days.

(21) Appl. No.: 10/785,420

(22) Filed: Feb. 23, 2004

(65) Prior Publication Data

US 2005/0021640 A1    Jan. 27, 2005

(51) Int. Cl.
*G06F 15/16* (2006.01)
*G06F 15/173* (2006.01)
*G06F 15/177* (2006.01)

(52) U.S. Cl. .................. 709/206; 709/225; 709/230

(58) Field of Classification Search ......... 709/200–206, 709/225, 230
See application file for complete search history.

(56) References Cited

U.S. PATENT DOCUMENTS 6,112,246 A * 8/2000 Horbal et al. ............... 709/230
6,446,192 B1 * 9/2002 Narasimhan et al. .......... 712/29
6,839,756 B1 * 1/2005 Boudou et al. .............. 709/225
6,944,650 B1 * 9/2005 Urien ......................... 709/217

FOREIGN PATENT DOCUMENTS

| EP | 0 964 325 A1 | 12/1999 |
| EP | 1 045 549 A1 | 10/2000 |
| WO | WO 00/19681 | 4/2000 |

OTHER PUBLICATIONS

David J. Preston, Internet Protocols Migrate to Silicon for Networking Devices, *Electronic Design*, Apr. 14, 1997, pp. 87-94.

* cited by examiner

*Primary Examiner*—Haresh N Patel
(74) *Attorney, Agent, or Firm*—Knobbe Martens Olson & Bear LLP

(57) ABSTRACT

The present invention relates to a method for transferring generic data acquired at a remote location to a central database based on e-mail communication, comprising encapsulating the acquired data in an electronic mail message, sending the electronic mail through a network (public or private) to a central database server, extracting the data from the electronic mail message by the central database server, and storing the extracted data in the central database. The acquired data is communicated directly to the database server by providing an architecture for Internet communication software for embedded platforms, the architecture being based on a network of software multiplexers and demultiplexers, controlled by an integrated protocol engine.

3 Claims, 15 Drawing Sheets

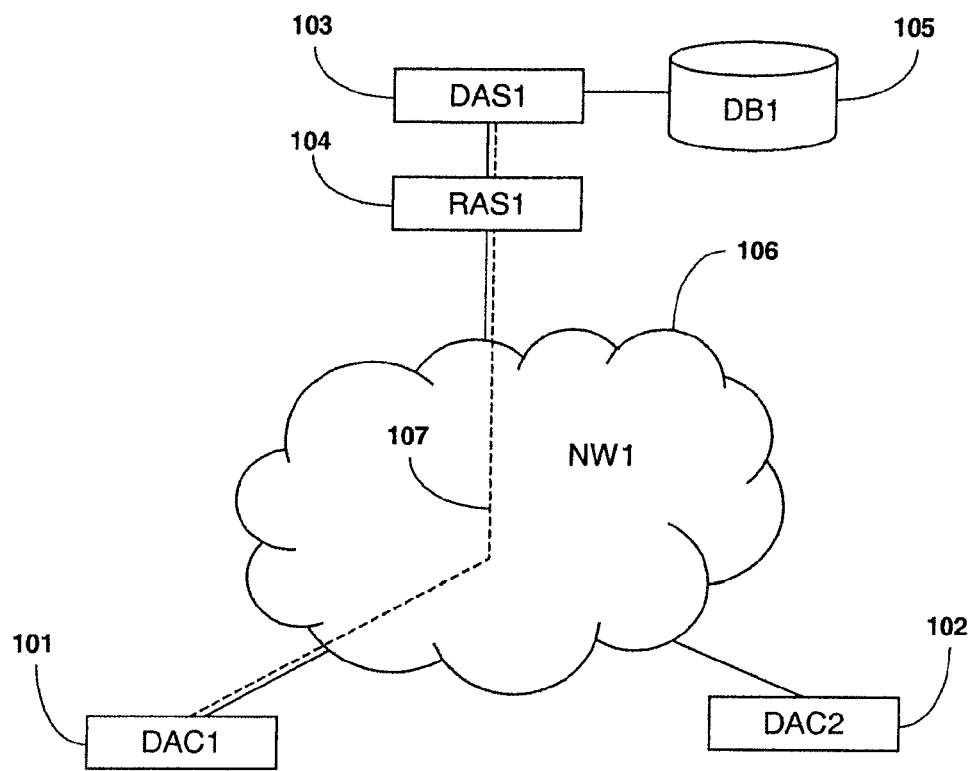
Figure 1.A

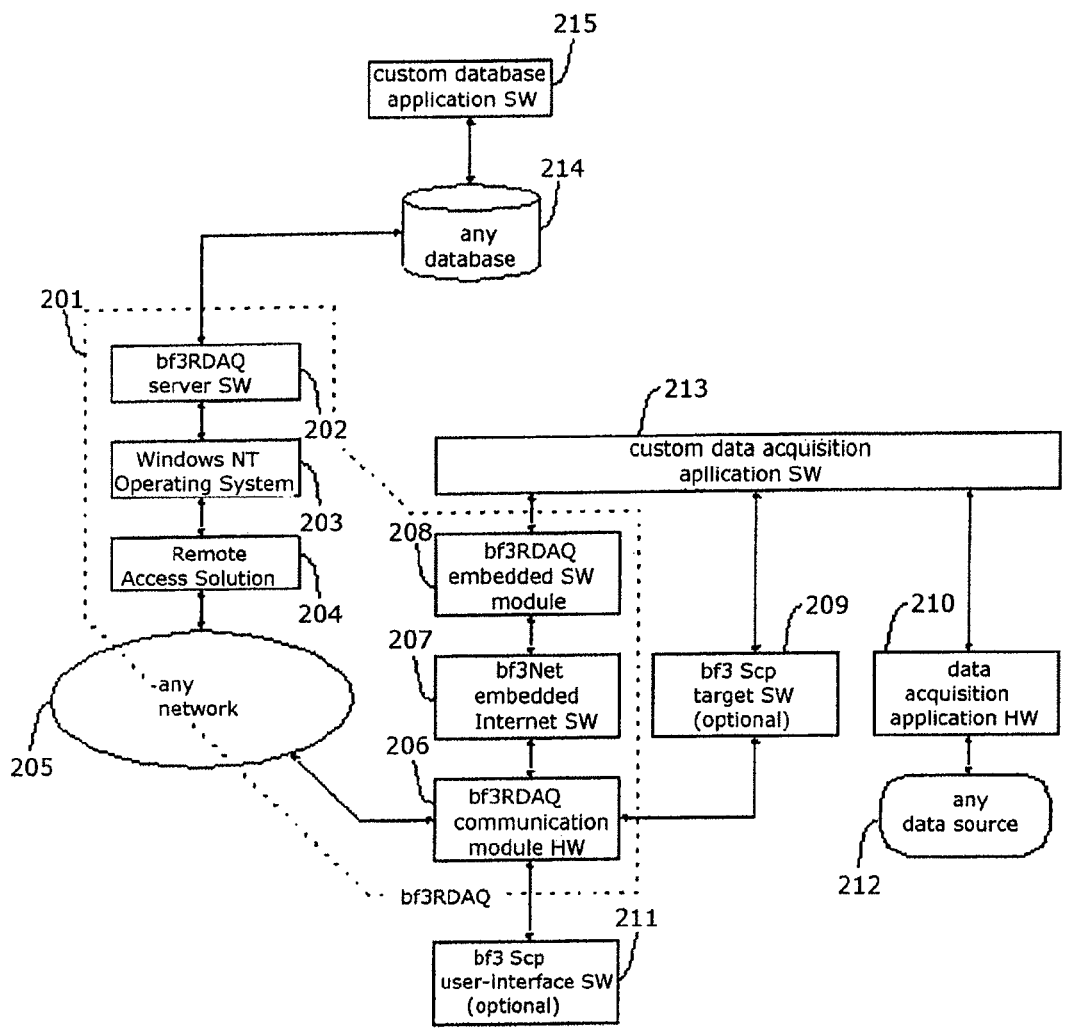
Figure 1.B

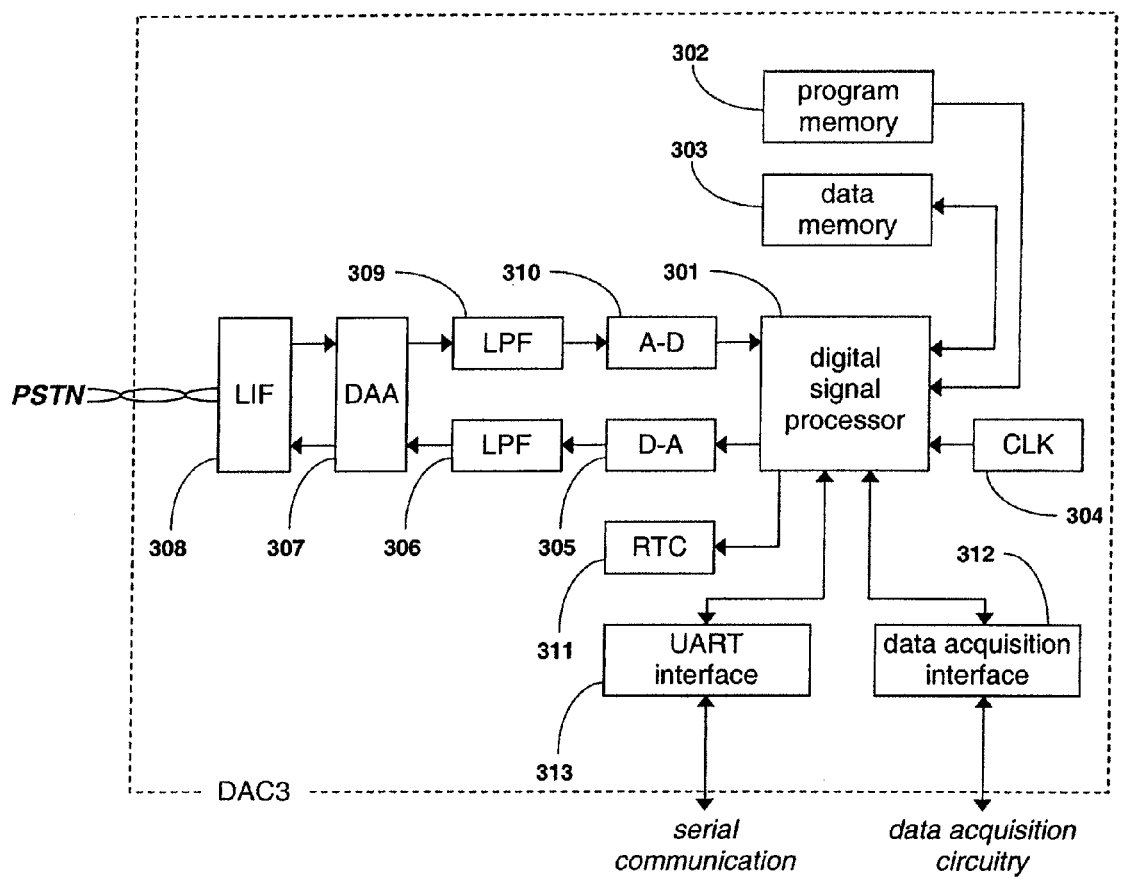
Figure 1.C

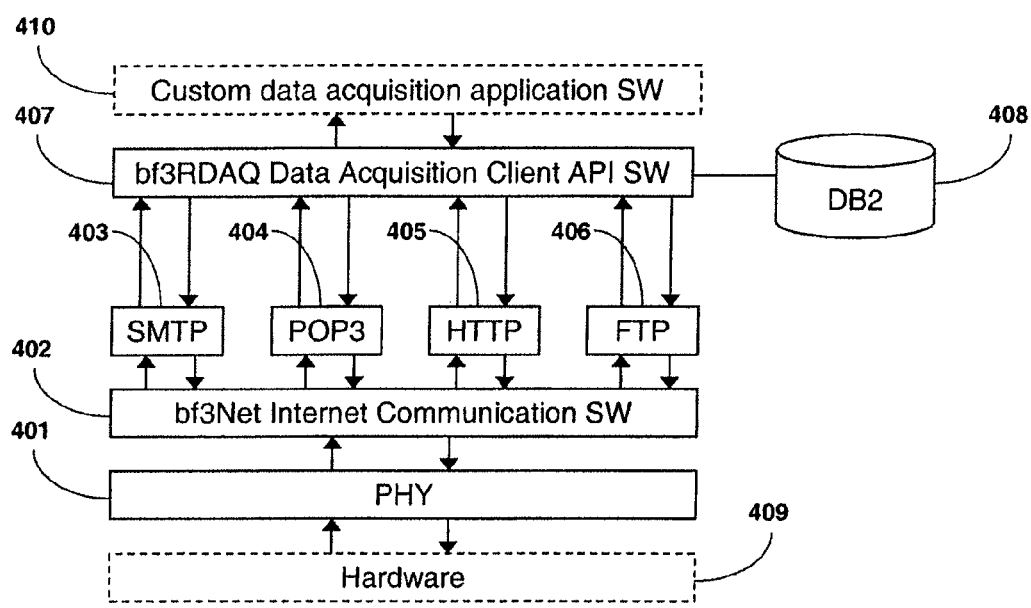
Figure 1.D

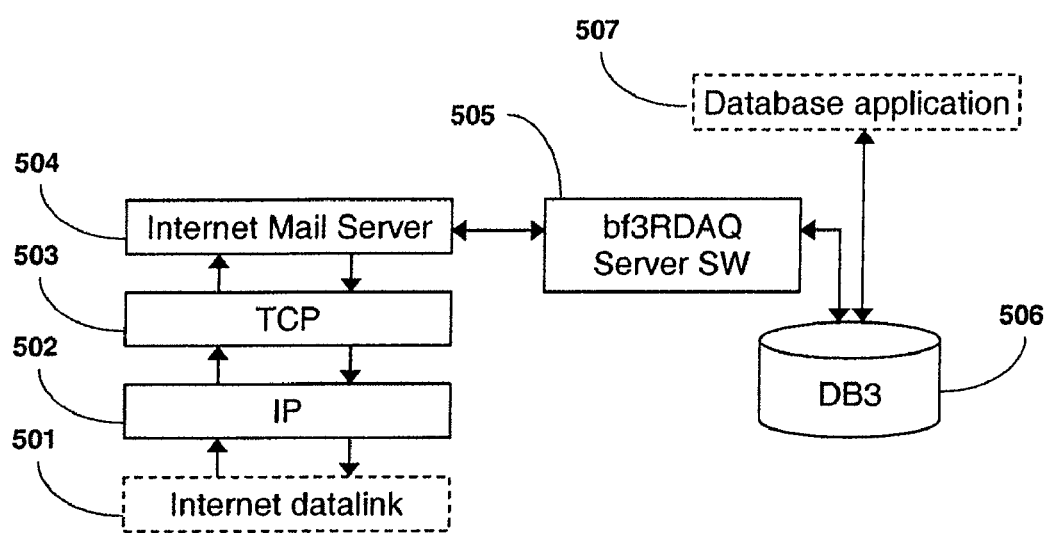
Figure 1.E

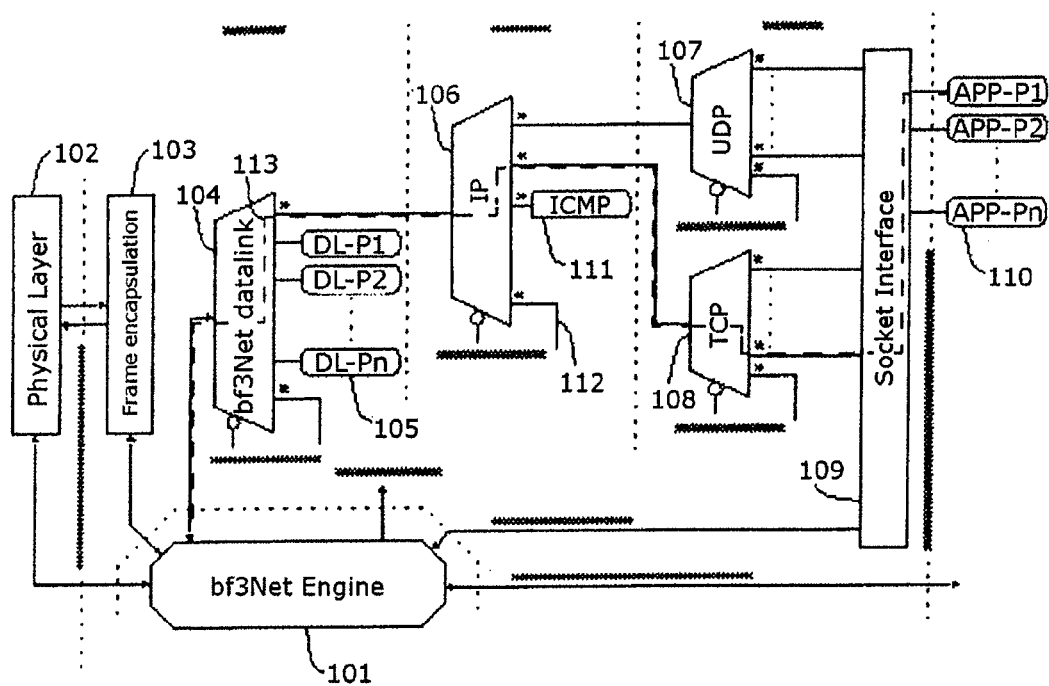
Figure 2.A

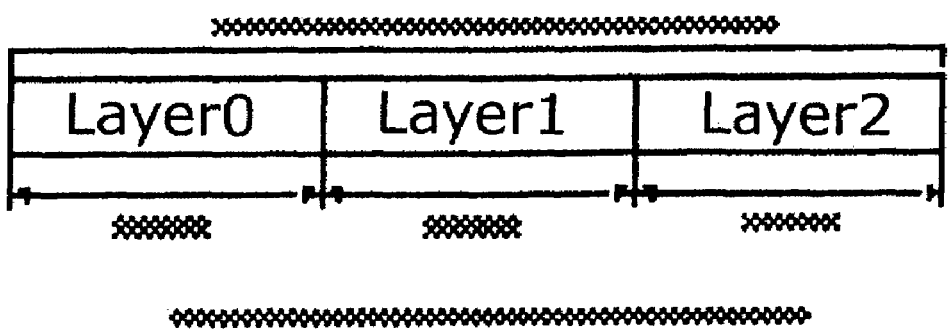
Figure 2.B

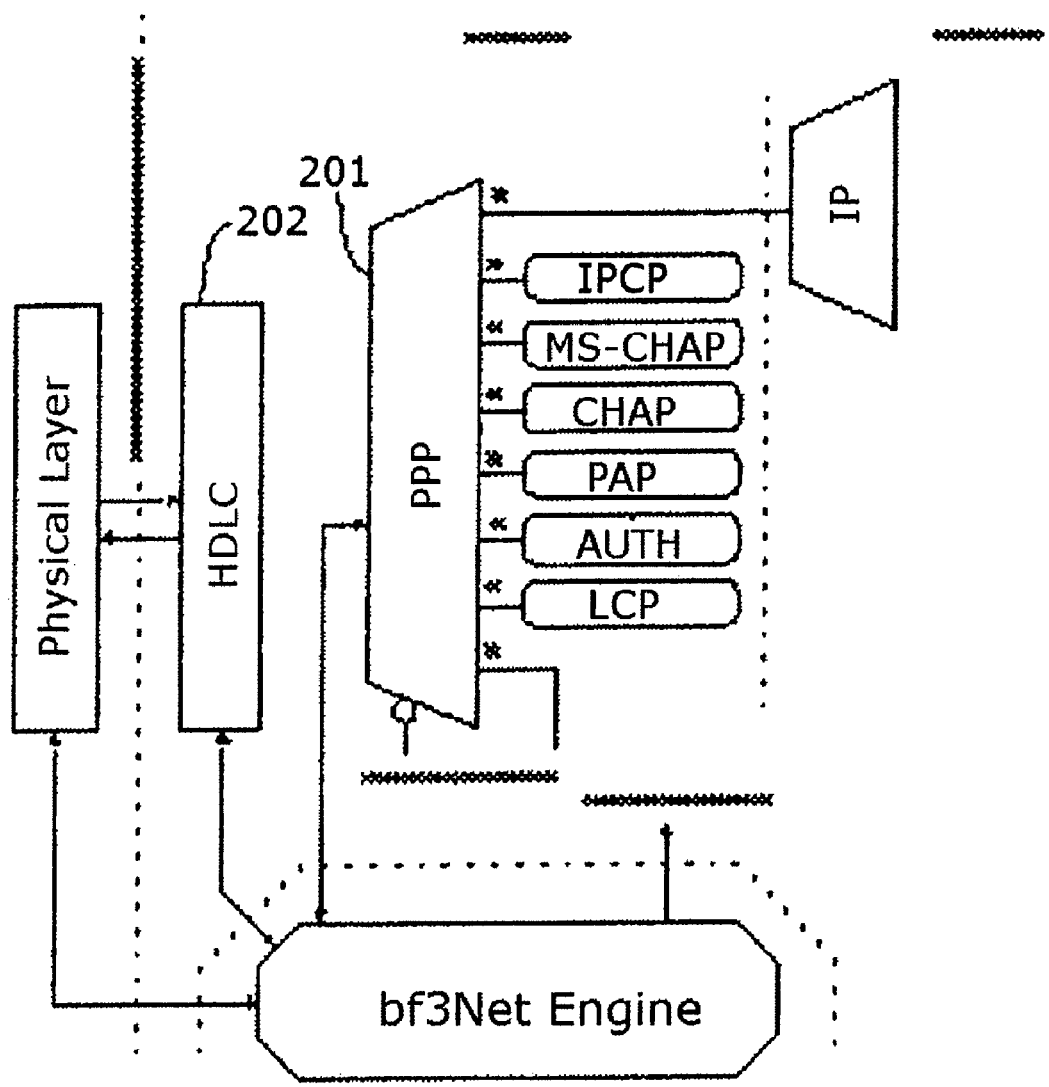
Figure 2.C

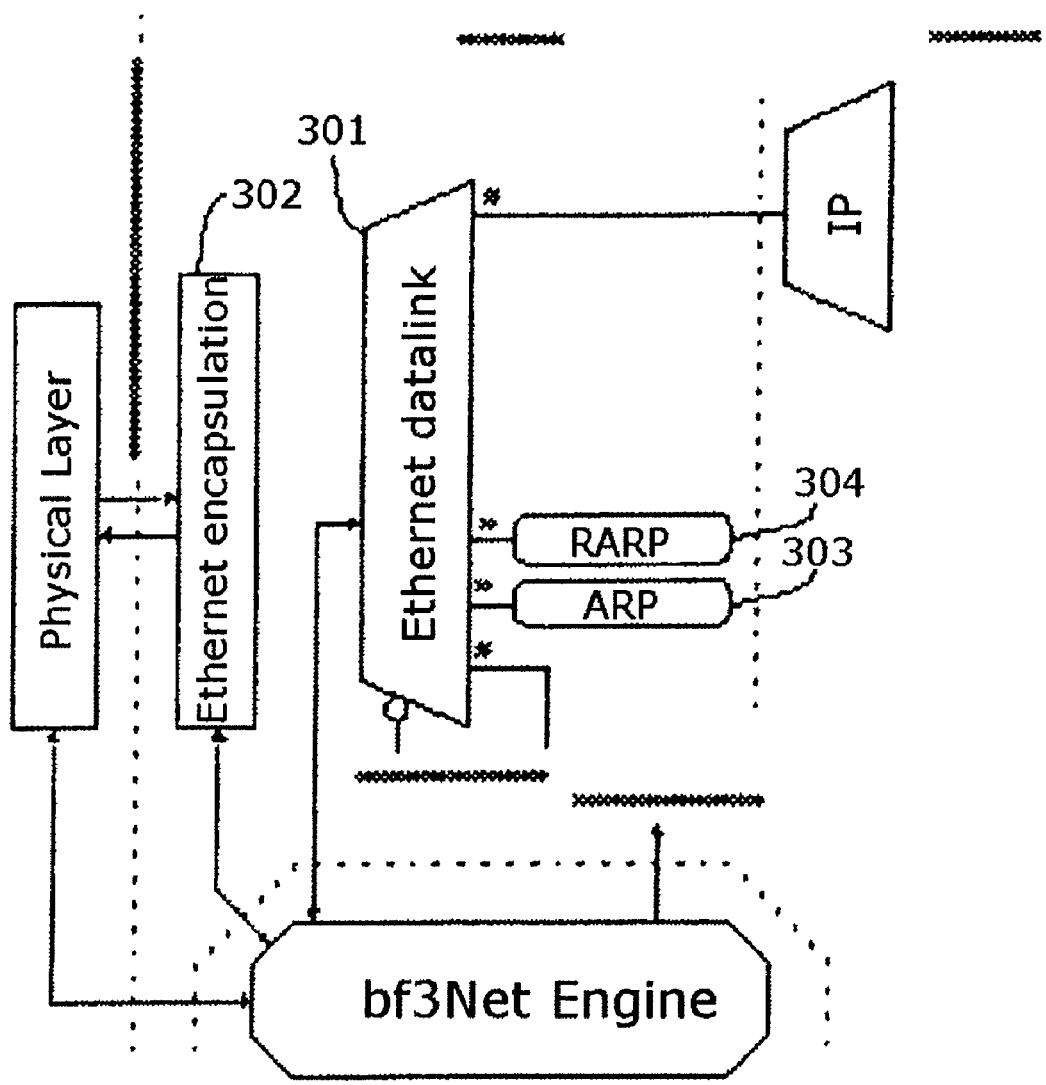
Figure 2.D

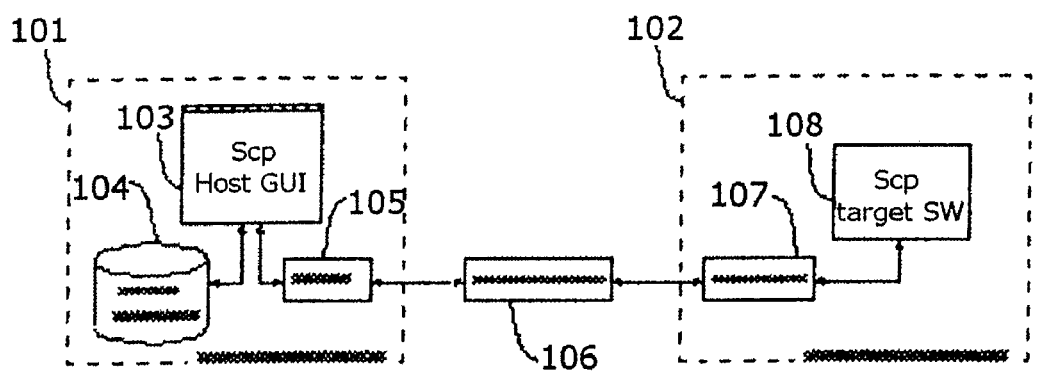
Figure 3.A

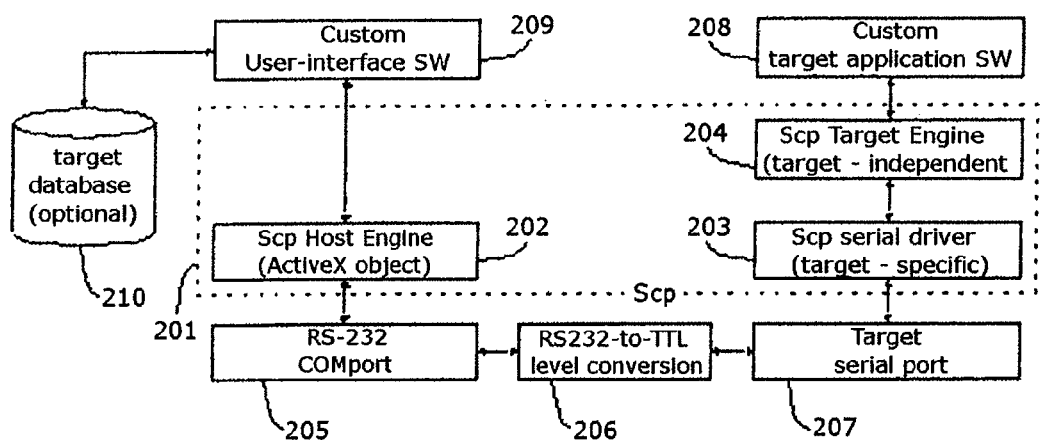
Figure 3.B

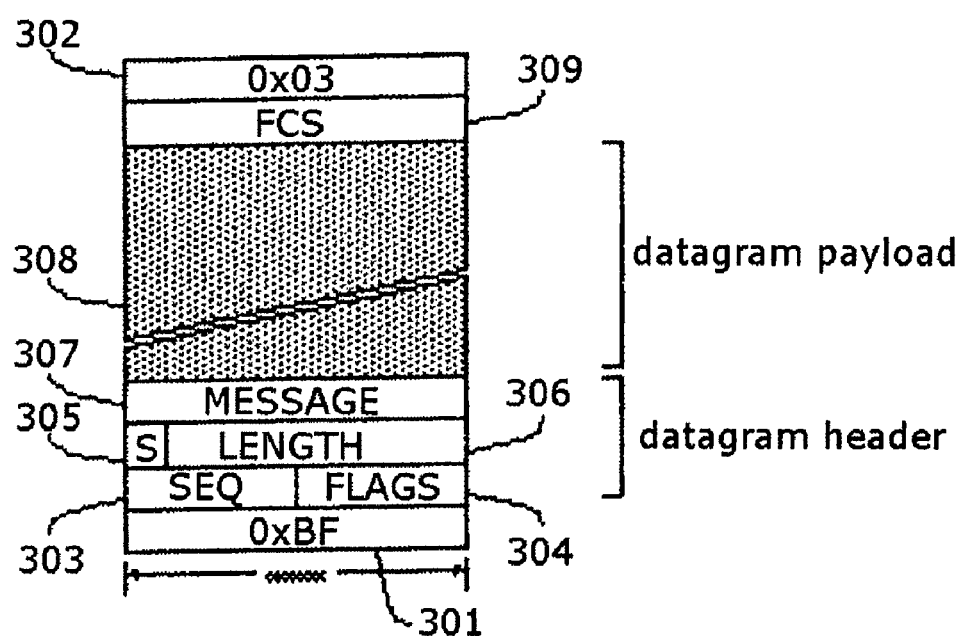
Figure 3.C

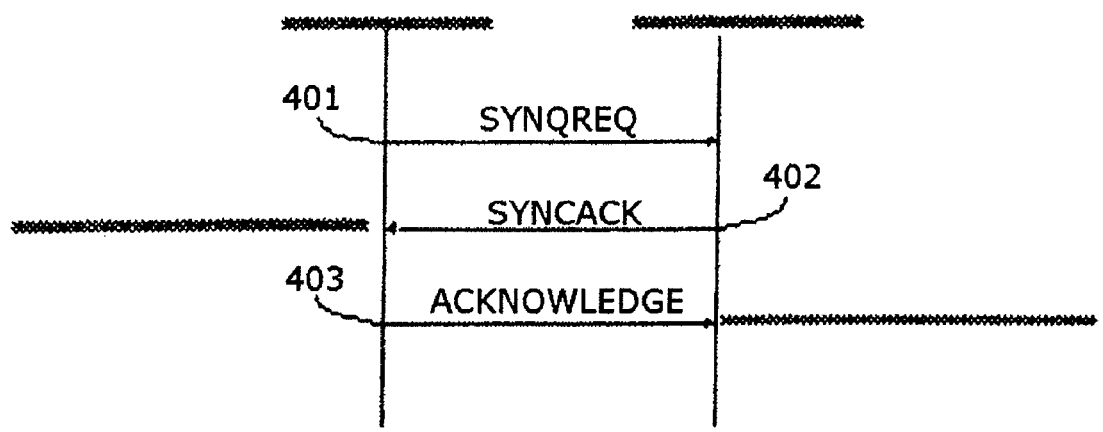
Figure 3.D

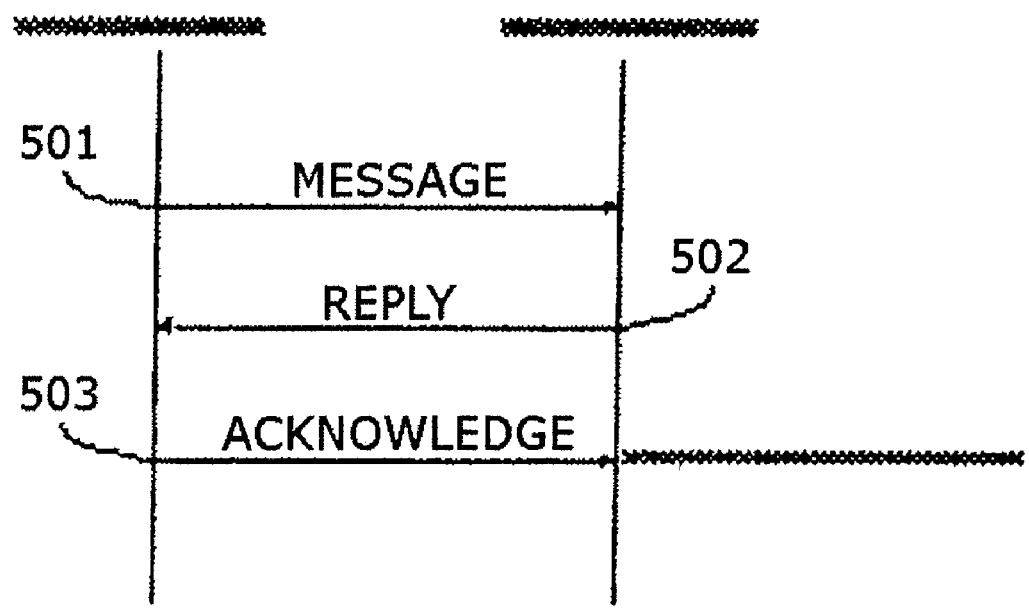
Figure 3.E

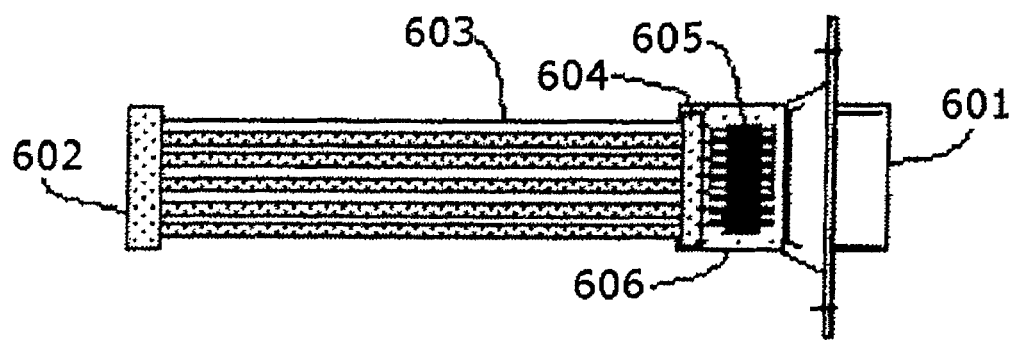
Figure 3.F

SYSTEM FOR REMOTE DATA ACQUISITION BASED ON E-MAIL MESSAGE COMMUNICATION THROUGH PUBLIC AND PRIVATE NETWORKS

CROSS REFERENCE TO RELATED APPLICATION

This application claims priority under 35 U.S.C. § 120 to PCT International Application Number PCT/EP02/09035, filed on Aug. 13, 2002 and published in the English language, which claims priority under 35 U.S.C. § 119 to European Patent Application Number 01870183.9 filed on Aug. 24, 2001. The disclosure of the above-described filed applications are hereby incorporated by reference in their entirety.

DESCRIPTION

FIELD OF THE INVENTION

The invention relates to a method for generic remote data acquisition, TCP/IP protocol stack architecture, application programming interface, apparatus therefor, and a serial communication architecture for configuration of said apparatus.

In a first aspect the present invention relates to a method and apparatus of transferring generic data acquired at a remote location to a central database by:
1. Encapsulating the data acquired by said apparatus in an electronic mail message,
2. Sending the electronic mail message by said apparatus through a network (public or private) to a central database server,
3. Extracting the data from the electronic mail message by the central database server,
4. Storing the extracted data in the designated database, where all communication complies with Internet standards.

The preferred embodiment of the invention is referred to as bf3RDAQ data acquisition method and bf3RDAQ data acquisition client device.

New is that the method and apparatus allow development of any remote data acquisition without any limitation on applications or the nature of the data by providing a transparent database interface and modular design architecture approach for said applications.

A second aspect of the invention relates to a scalable and modular TCP/IP protocol stack architecture designed for the client-side Internet communication of the bf3RDAQ remote data acquisition application, and other applications, which incorporate Internet-type communication. Such architecture enables the bf3RDAQ data acquisition client application to communicate directly with the bf3RDAQ server.

A third aspect of the invention relates to a communication architecture for configuration and maintenance of the data acquisition client application, and other (embedded) applications.

A fourth aspect of the invention relates to an e-mail communication method for remote management of the data acquisition client application by the server.

A fifth aspect of the invention relates to an HTML based configuration interface which is accessible through the communications interface of the data acquisition client device.

The sixth aspect of the invention relates to FTP-based or HTTP-based updating of the data acquisition client software.

The seventh aspect invention relates to a definition for a cable which integrates RS232-to-TTL signal level conversion.

BACKGROUND OF THE INVENTION

Currently, architectures for remote data acquisition applications are either based on proprietary communication protocols or infrastructures, or both. In many cases, custom hardware is developed to acquire the data and send it to the server application. This has four important disadvantages:
1. Proprietary protocols require extensive development and testing, both on the client and server end.
2. Proprietary infrastructures are expensive in terms of development, implementation and maintenance, and often require great effort in achieving general acceptance.
3. Long-distance data transfer is either impossible, or requires conversion to other communication protocols (e.g. Public Switched Telephone Network).
4. Custom hardware implementations require extensive development and testing, and offers little reuse possibilities.

The first and second item make development of remote data acquisition applications unnecessary expensive, and both may imply a great development risk.

The third item makes developing applications which collect data from scattered locations in large areas (e.g. the global inventory or sales sites of a company) extremely difficult, and expensive.

The fourth item increases the overall development time of the application, and the limited reuse possibility results in additional cost to the application.

Methods for transferring collected data by means of email messages have been described in the art. EP 1,045,549 describes a method for monitoring and management of distributed networks. The performance data is gathered by a designated served in each network, which sends the accumulated performance data to one or more central servers. The central servers together constitute the supervisory system for monitoring and management of the distributed networks.

EP 964,325 describes a method for managing field devices in industrial process systems.

Both above-described methods are based on a gateway architecture. In the method according to EP 1,045,549, for instance, a designated server in the client network assumes the gateway architecture task: it collets the data from the hosts in the client network and transfers the accumulated data to the central server. In the method according to EP 964,325 field devices submit data to a gateway through proprietary or non-Internet protocols. The gateway processes and formats the data and forwards this data to a central server on behalf of the field devices, which stores the received data in a database.

However, the use of a gateway architecture requires extensive development and testing and involves a time-consuming process.

Also, both above-described methods relate to particular fields of application. The method described in EP 1,045,549 is related to the management of distributed networks, while the method described in EP 964,325 is related to the management of field devices in an industrial process system. Neither of the cited documents claims a method for remote acquistion of generic data.

To avoid the difficulties and drawbacks of the prior art methods, it would be desirable to provide a method and apparatus which reduce the time and effort required for the development of remote data acquisition applications. Also, it would be advantageous to provide a method and apparatus, which enable the acquisition of generic data at a remote location, without limitations on the nature of the data or on applications.

The invention provides therefor a method according to claim 1. The apparatus of the invention is given in claim 2. The computer readable medium of the invention is given in claim 3.

Regarding the second aspect of the invention, currently, architectures of TCP/IP protocol stacks for embedded applications are usually based on a model of stacked protocol layers. This model is derived from conventional design concepts used for high-performance processor environments. As such, it is not well suited for embedded applications which are based on processors with limited processing bandwidth and memory resources. The TCP/IP communication architecture of the present invention provides a modular and scalable concept for the development of embedded systems with Internet connectivity.

Regarding the third aspect of the invention, currently, configuration interfaces for embedded applications are generally developed on a per-application basis. Because developing and testing the underlying communication is a time-consuming task, it increases the development risk. The serial communication architecture of the present invention allows development times of configuration interfaces, which are significantly shortened.

Regarding the fourth aspect of the invention, currently, management of remote systems from a central location is usually implemented with custom applications. By making use of the e-mail communication method of the present invention, the same architecture which is used for the remote data acquisition application can be used for management of the client data acquisition apparatus. The client-server nature of such architecture enables the data acquisition client application to communicate directly with the server.

Regarding the fifth aspect of the invention, currently, configuration and management of data acquisition clients from a remote device is usually done with custom hardware, software and protocols. By making use of an embedded HTTP server (web server), the configuration and management interface for access from a remote device can be based on TCP/IP communication and be implemented with a standard HTTP client (web browser), such as Microsoft Internet Explorer.

Regarding the sixth aspect of the invention, currently, the updating of software versions from remote locations is usually performed with proprietary bootloader protocols. By making use of the FTP protocol, the software update can be based on TCP/IP communication and be implemented with any FTP-compliant server.

Regarding the seventh aspect of the invention, currently RS-232-to-TTL signal level conversion is either provided by the embedded system hardware, or through additional external conversion circuitry. By integrating this function in the cable connector, the total product cost and the system complexity can be reduced.

SUMMARY OF THE INVENTION

The present invention is a system, method and apparatus (consisting of hardware, firmware and software) for transferring generic data acquired by said apparatus from a remote location to a central database.

The system of the present invention consists of a central database server, and a number of bf3RADQ data acquisition clients, which can establish communication connections to the server through any network which is capable of accomodating Internet communication. The data acquisition clients process and store the locally acquired data until it needs to be conveyed to the server application. The server application has access to the database.

Importantly, the system, method and apparatus according to the invention are suitable for acquiring generic data, without any limitations for application or the nature of the data.

An essential feature of the invention is the fact that the bf3RADQ data acquisition clients can establish direct communication connections to the server by using a client-server architecture. The system, method and apparatus according to the invention do not require the use of gateway architecture.

Another essential feature of the invention is the use of electronic mail for the encapsulation of the acquired data, and for transferring the encapsulated acquired data to the central server which hosts or connects to the target database. For physical layer communication, any network which allows Internet communication (e.g. LAN, WAN) can be used. This implies that any remote data acquisition application can be based on existing infrastructures and widely accepted (Internet) communication standards. It therefore is a new genuine universal data acquisition method and system, not based on proprietary communication concepts or infrastructures.

The apparatus provides the following functions:
1. Generic data processing (incl. RAM and ROM for data/program storage)
2. Physical layer communications interface (e.g. V.series modem, Ethernet, ISDN)
3. Real-time clock
4. Power-management
5. Non-volatile data storage
6. Interfaces with the data acquisition hardware (e.g. SPI, $I^2C$)
7. UART serial interface By providing a well-defined application programming interface API, the development of the remote data acquisition client is limited to the application-specific hardware and software.

The second aspect of the present invention is the architecture on which the client application Internet communication software is based. Rather than following a conventional stack model, the bf3Net Internet communication software is based on a design approach which is used in designing hardware signal routing structures. The bf3Net Internet communication architecture (TCP/IP communication architecture) of the present invention is based on a network of multiplexers and demultiplexers controlled by an embedded protocol engine. This architecture has the following advantages:
1. It is platform-independent (processor or operating system),
2. It is well-structured and modular
3. It is highly configurable
4. It is well-suited for embedded applications By providing such an Internet communication architecture, data acquisition clients can be tailored and optimized for the application requirements. The same applies for other embedded applications.

The third aspect of the present invention is the bf3Scp serial communication architecture with which the bf3RDAQ data acquisition client can be configured through the UART serial interface provided by the apparatus of the invention. The chosen architecture has the following advantages:
1. The communication protocol is implemented by a host and target protocol engine, which can be reused for every application.
2. The development of the host implementation of the configuration interface is limited to the user interface functions (e.g. Windows user interface elements with underlying functions).

3. The development of the target application is limited to the processing of the received messages, and providing a reply.

It is mentioned that for other embedded applications the serial communication architecture of the present invention can be used as well.

An essential feature of the invention is the use of a target database which contains all the parameters associated with the target application (e.g. timing parameters and message identifiers). By identifying the target application with the following, globally unique, identifiers:

1. 32-bit vendor identifier,
2. 32-bit application identifier, these parameters can be retrieved from the target database. In particular, sets of messages can be assigned to a target application. The target unit can further be identified by a 32-bit serial number.

The fourth aspect of the invention is a method for indirect configuration of the data acquisition client by the server application. The bf3RDAQ data acquisition client can be configured to retrieve electronic mail messages from its mailbox at the server by means of the POP3 protocol. These messages contain configuration data, which the POP3 client evaluates to adjust their locally stored configuration settings. Advantageously, as mentioned above, by making use of the e-mail communication method of the present invention, the same TCP/IP communication architecture that is used for the remote data acquisition application can be used for management of the client data acquisition apparatus.

The fifth aspect of the invention is a method for direct configuration of the bf3RDAQ data acquisition client from a remote location. A person or machine can establish an Internet-based communication session based on the TCP/IP communication architecture with the bf3RDAQ client through the network to which both connect. By interacting through an HTML file which is served by the bf3RDAQ data acquisition client embedded HTTP server, the configuration and status settings can be monitored or adjusted.

The sixth aspect of the invention is a method for updating of the data acquisition client software version by downloading a software image from the central server with the FTP or HTTP protocol. By making use of the FTP protocol, the software update can be based on TCP/IP communication and be implemented with any FTP-compliant server.

The seventh aspect of the invention is a serial communications cable with integrated RS232-to-TTL signal level conversion.

BRIEF DESCRIPTION OF THE DRAWINGS

In the drawings three sets of figures are given. The same reference numbers have been used for each of the separate sets 1, 2 and 3. FIGS. 1, 2 and 3 respectively are illustrations of embodiments of the first, second and third aspect of the invention.

FIG. 1.A is a system overview of the bf3RDAQ remote data acquisition system according to the present invention, including two (2) bf3RDAQ data acquisition clients [DAC1] and [DAC2] at the remote locations, and a bf3RDAQ data acquisition server [DAS1], all with access and connected to the same Internet Protocol-compatible network.

FIG. 1.B is a decomposition of all the elements which together constitute the bf3RDAQ remote data acquisition system according to the present invention.

FIG. 1.C is a functional block diagram of an embodiment of a bf3RDAQ data acquisition client [DAC3], according to the present invention.

FIG. 1.D is an architecture diagram of the bf3RDAQ data acquisition client application software [AS1], according to the present invention.

FIG. 1.E is an architecture diagram of the bf3RDAQ data acquisition server application software [AS2], according to the present invention.

FIG. 2.A is a general architecture diagram [AD1] of the bf3Net Internet communication software, according to the present invention.

FIG. 2.B shows the layout of the path descriptor within the bf3Net Internet communication software, according to the present invention.

FIG. 2.C is a datalink architecture diagram [AD2] of the bf3Net Internet communication software for Point-to-Point Protocol (PPP) connections, according to the present invention.

FIG. 2.D is a datalink architecture diagram [AD3] of the bf3Net Internet communication software for Ethernet connections, according to the present invention.

FIG. 3.A is a system overview of a configuration interface application based on the bf3Scp serial communication architecture, according to the present invention.

FIG. 3.B is a protocol layer model of a bf3Scp communication session between a host and target implementation based on the bf3Scp serial communication architecture, according to the present invention.

FIG. 3.C is the datagram format of the messages of the bf3Scp serial communication architecture, according to the present invention.

FIG. 3.D is the datalink establishment procedure of the bf3Scp serial communication architecture, according to the present invention.

FIG. 3.E is the datagram exchange procedure of the bf3Scp serial communication architecture, according to the present invention.

FIG. 3.F is the block diagram of an embodiment of the communication cable with integrated signal conversion, according to the present invention.

DETAILED DESCRIPTION OF THE INVENTION

FIG. 1.A shows two bf3RDAQ data acquisition clients 101 and 102 of the present invention, and the system in which they operate. Both devices have access to a network 106. The system further consists of a bf3RDAQ data acquisition server 103, which connects to a database 105. In FIG. 1.A a bf3RDAQ data acquisition client 101 establishes a connection 107 through the network 106 to the bf3RDAQ data acquisition server 103. Depending on the type of network, a Remote Access Server 104 may be needed (e.g. for modem/ISDN connections) as a router between the server and the clients.

FIG. 1.B provides more detailed overview of the elements which constitute the bf3RDAQ remote data acquisition system 201 of the present invention. The system consists of the following building blocks:

1. The bf3RDAQ embedded software module 208
2. The bf3Net Internet Communication software module 207
3. The bf3RDAQ communication hardware module 206
4. The bf3RDAQ server software module 202
5. An operating system platform 203 (e.g. Microsoft Windows, UNIX)
6. An optional Remote Access Server 204

The bf3RDAQ server software module 202 has access to a database 214.

On the client side, to create a custom data acquisition application 213, the application developer must design the application-specific data acquisition hardware 210 to retrieve data from the data source 212. On the server side, the application developer must design a database application which interacts with database 214.

The bf3RDAQ remote data acquisition system of the present invention can further be enhanced by adding the bf3Scp target software module 209 which interacts with a bf3Scp User-Interface application 211 through the bf3RDAQ communication hardware module 206.

A block diagram of an embodiment of a modem bf3RDAQ data acquisition client communication hardware module, according to the present invention, is shown in FIG. 1.C. All data and communication processing is performed by the digital signal processor 301. The digital signal processor has access to data memory 303 and program memory 302, and is clocked by a clock device 304. A real-time clock (RTC) 311 serves as time reference.

The communication channel of the modem bf3RDAQ data acquisition client communication hardware module, according to the present invention, consists of a telecommunications line interface (LIF) 308 together with a Direct Access Arrangement (DAA) 307. The receive path further consists of a low-pass filter (LPF) 309 and an analog-to-digital (A-D) converter 310. The transmit path further consists of a digital-to-analog (D-A) converter 305 and a low-pass filter (LPF) 306. The line interface circuitry 308 is able to detect an incoming call, and the identifier of the calling party. Thus, the bf3RDAQ data acquisition client can selectively act as a receiver. The line interface circuitry 308 also detects if the telephone line is in use prior to establishing a connection or requested during an active connection by another party. Thus, the bf3RDAQ data acquisition client can be configured not to interfere with other equipment and to release the line in case of emergency conditions.

For serial communication, a Universal Asynchronous Receiver and Transmitter (UART) interface 313 is provided. To interface with the application-specific data acquisition hardware, a data acquisition interface 312 is provided.

An architecture block diagram of the bf3RDAQ data acquisition client software, according to the present invention, is shown in FIG. 1.D. The central element of the architecture is the bf3RDAQ Application Programming Interface (API) software module 407. It interfaces with an embedded database 408, which acts as local storage of the data acquired by the client, and of configuration data which controls the operation of the data acquisition client.

The bf3RDAQ Application Programming Interface (API) software module 407 further interfaces with the bf3Net Internet Communication software module 402, according to the present invention, through the following Internet application protocol modules:

1. Simple Mail Transfer Protocol (SMTP) client application module 403,
2. Post Office Protocol Version 3 (POP3) client application module 404,
3. HyperText Transfer Protocol (HTTP) server application module 405,
4. File Transfer Protocol (FTP) client application module 406.

The Simple Mail Transfer Protocol (SMTP) 403 is used to transfer the data acquired by the bf3RDAQ client, encapsulated in an electronic mail message, from the bf3RDAQ data acquisition client embedded database 408 to the bf3RDAQ central database, according to the present invention.

The Post Office Protocol Version 3 (POP3) 404 is used to transfer data (e.g. configuration data), encapsulated in an electronic mail message, from the bf3RDAO central database to the bf3RDAQ data acquisition client embedded database 408.

The HyperText Transfer Protocol (HTTP) server 405 is used to provide HTML configuration interfaces which can be accessed through a compliant web browser (e.g. Microsoft Internet Explorer).

The File Transfer Protocol (FTP) 406 is used to transfer new software versions from the bf3RDAQ Server, according to the present invention, to the bf3RDAQ data acquisition client. The new software version can then be stored in the program memory of the bf3RDAQ data acquisition client, according to the present invention.

The bf3Net Internet Communication software module 402 further interfaces with the physical layer communications driver (PHY) 401 which interacts with the communications hardware 409 (e.g. modem or ISDN interface).

The bf3RDAQ Application Programming Interface (API) software module 407 further provides programming interface functionality to facilitate the design of the custom data acquisition application software 410.

An architecture block diagram of the bf3RDAQ data acquisition server software, according to the present invention, is shown in FIG. 1.E. The central element of the architecture is the bf3RDAQ Server software module 505. It interfaces with the central database 506, which acts as the storage of the data acquired by all clients of the data acquisition application system, according to the present invention.

The bf3RDAQ Server software module 505 further interfaces with a standard SMTP- and POP3-compliant Internet Mail Server 504, from which it retrieves the acquired data which is sent to the server by a bf3RDAQ data acquisition client, according to the present invention. The Internet Mail Server 504 provides dedicated electronic mailboxes with associated electronic mail addresses for the reception of data messages from the bf3RDAQ data acquisition clients.

The Internet Mail Server 504 can also be used to send data from the central database 506 to a bf3RDAQ data acquisition client. For this purpose, each bf3RDAQ client in the bf3RDAQ data acquisition application system must have a POP3 mailbox at the Internet Mail Server 504.

The Internet Mail Server makes use of the Transmission Control Protocol (TCP) 503, the Internet Protocol (IP) 502, and an Internet-compatible datalink 501 (e.g. Ethernet) for communication through the network, according to the present invention.

A custom database application 507 is the only component that needs to be provided by the application developer to complete the server-side of the bf3RDAQ-based data acquisition application, according to the present invention.

FIG. 2.A shows the architecture of the bf3Net Embedded Internet Communication software, according to the present invention, as a conceptual network of multiplexers and demultiplexers (or mxDmx network, for short), controlled by a protocol engine (bf3Net Engine) 101.

A node in the mxDmx network is either a multiplexer or a protocol module. Each multiplexer has a number of input ports. By making the number of ports statically configurable for each multiplexer, the topology of the mxDmx network can be customized for the application.

The bf3Net architecture, according to the present invention, is subdivided into a number of functional layers. These layers are defined as follows:
1. Layer 0: Datalink and Frame Encapsulation Layer
2. Layer 1: Internet Protocol Layer 3. Layer 2: Transport protocol and socket layer It is important to stress that this layer structure is based on functional properties, not on communication layer assignments.

Layer 0 of the bf3Net architecture, according to the present invention, is only discussed in general terms in the context of FIG. 2.A. Please refer to one of the description of FIGS. 2.C. and 2.D for the specific details of the datalink layer implementations. The datalink is conceptually depicted as a datalink multiplexer 104 with a number of datalink protocol modules (DL-Px) 105, together with a frame encapsulation module 103.

Layer 1 of the bf3Net architecture, according to the present invention, consists of the Internet Protocol multiplexer 105, and the application protocol modules which reside at this layer, such as the Internet Control Message Protocol (ICMP) module 111.

Layer 2 of the bf3Net architecture, according to the present invention, consists of the Universal Datagram Protocol (UDP) multiplexer 107, and the Transmission Protocol (TCP) multiplexer 108. Both multiplexers connect to the bf3Net Socket Interface module 109, which is also part of Layer 2 of the bf3Net architecture.

The bf3Net socket interface module 109 acts as a cross-connect between the UDP and TCP multiplexers and the application protocol modules 110 (indicated as APP-Py in FIG. 2.A). The bf3Net Socket Interface module 109 is part of the bf3Net Application Programming Interface 114.

To each input of a multiplexer, either a protocol module or another multiplexer is connected. Each multiplexer port is identified by a number which is unique for a multiplexer. Which node is connected to which port can also be (statically) configured. The port identifiers at each layer are used to describe a path through the mxDmx network. Such a path descriptor can be an 8-bit or 16-bit value with a field for each functional layer. The path descriptor format is shown in FIG. 2.B. For example, the path 113 from the engine to TCP socket 1 is identified as 7-2-1 (or 0xF1) in an 8-bit configuration (3:2:3 bits).

Port 0 of every multiplexer in the mxDmx network of the bf3Net architecture (e.g. port 0 112 of the IP multiplexer 106), according to the present invention is reserved and serves as a data sink for incoming data which must be discarded. The reason for this will be explained below.

The central element of the bf3Net architecture is the bf3Net Engine 101. It performs the following tasks:
1. Management of the bf3Net communication session,
2. Management of the physical communication layer 102,
3. Operation of the multiplexers and demultiplexers,
4. Management of the data buffers,
5. Timer management,
6. Collection of debug and profiling information.

The interface between the bf3Net Engine 101 and the mxDmx network is implemented by the datalink multiplexer 104. The bf3Net Engine also interfaces with the Frame Encapsulation module 103 in a similar way.

The bf3Net Engine 101 can be seen as a Central Processing Unit (CPU) of the bf3Net software. As such, the bf3Net Engine 101 requires a clock signal to keep it running. This clock signal must be offered externally as a timer tick or an operating system task. The bf3Net Engine 101 is able to (re)schedule itself in the latter case.

The nodes in the mxDmx network, according to the present invention, interact with the bf3Net Engine 101 by sending messages to the bf3Net Engine 101 through the mxDmx network. To identify the originator of the message, the path descriptor is used. The following messages types are defined:

1. Data buffer request
2. Data buffer grant
3. Timer request
4. Timer expiration
5. Status messages
6. Event notifications
7. Error reports The bf3Net Engine 101 processes the messages and responds accordingly. The bf3Net engine 101 has two types of messages it can send upstream through the mxDmx network: routed messages (using a path descriptor), or broadcast messages. Each node in the network is required to pass broadcast messages to all connected upstream nodes, and to route other messages to the appropriate node.

Data is passed through the mxDmx network by means of data buffers (not depicted in FIG. 2.A), which are identified by a unique number. These buffers are managed by the bf3Net Engine 101. Before a buffer can be used, a node needs to request access by sending the corresponding message to the bf3Net Engine 101. The same applies for the use of timers.

Access to a data buffer is granted on priority and age (first come, first serve). The responses to the nodes are also routed through the mxDmx network based on path descriptors. When a node no longer requires access to a buffer, it must release the buffer; again, this is done by sending a message to the bf3Net engine 101 through the mxDmx network.

When data is received from the physical layer 102, the bf3Net Engine 101 is notified through the bf3Net Physical Layer Interface (PLI) 113. The bf3Net Engine notifies the Frame Encapsulation module 103, which retrieves the data from the physical layer, and stores it in a data buffer (which was requested from and granted by the bf3Net Engine 101).

Once a complete frame has been received, bf3Net Engine 101 is notified by the Frame Encapsulation module 103, and the following three-step procedure is invoked:
1. The bf3Net Engine forwards the data buffer to mxDmx network to setup the path descriptor.
2. The path identifier is masked depending on the state of the communication session.
3. The data buffer is processed, based on the (masked) path identifier.

The first step is based solely on the parameters in the received frame (datalink, IP, and TCP/UDP protocol identifier). Since a protocol is mapped to a port, a demultiplexer needs to do nothing more than fill the appropriate field of the path descriptor and pass the buffer to an upstream multiplexer if applicable, or terminate if the path leads to a protocol module at its layer. If a protocol is not supported or recognized, a value of '0' should be entered. During this step, the data integrity verification is also done (e.g. IP checksum). If this verification fails, the path is also set to '0'.

The second step is done by the bf3Net Engine 101 to mask the upstream path in case a path is not available (e.g. to avoid processing of an incoming TCP segment when the datalink has not yet been established). All unsupported path fields are set to '0'.

The third step is the actual data processing. Because the 'zero port' is reserved as universal sink for data which must be discarded, all erratic data buffers are led to this port, which simply releases the data buffer. If the data is correct in the general sense, it is led to appropriate protocol module, based on the established path descriptor.

This procedure (in combination with the zero ports) is the key to simplifying the design of the multiplexers, as they need to have no knowledge of other protocol layers (apart from the routing information) whatsoever. Also, by choosing this design approach, a protocol module can easily be exchanged, because the demultiplexing and protocol functions are isolated from each other. Another powerful feature of this architecture is the fact that the mxDmx network is used for both the control and data communication. The design of the protocol nodes can all be based on a common design framework.

When data must be transmitted, the applicable protocol node must fill its part of the requested data buffer (once access is granted), and pass it to the downstream multiplexer node. Please note that this statement implies two things: (a) a multiplexer will never request a data buffer, (b) a protocol node will never pass a buffer to another protocol node. This again simplifies the design of the mxDmx network nodes. Before a node passes a data buffer downstream, it must set the downstream port number in the path descriptor for the buffer. All downstream multiplexers will add their protocol information (e.g. IP header), using the path descriptor. When a completed buffer has been sent by the physical layer, the originating node will be notified.

If a physical layer communication channel needs to be opened (e.g. a modem connection), the bf3Net socket interface module 109 will directly signal the bf3Net Engine 101 to do so. A channel identifier can be passed with this request. The bf3Net Engine 101 will instruct the physical layer to start opening the connection, and notify the mxDmx network once the physical layer indicates it is ready. The bf3Net Engine 101 will then coordinate establishment of the datalink, and manage it afterwards, based on the event notifications it receives from the mxDmx network nodes.

The bf3Net Engine 101 can individually or collectively enable and disable multiplexers with the 'enable signals' shown in FIG. 2.A. Each multiplexer in the mxdmx network has an MUX_ENABLE input for this purpose. This way, if needed, the bf3Net Engine 101 can selectively stop data processing (e.g. in case the communication link is lost).

Finally, the bf3Net Engine 101 collects and maintains information, which can be used for profiling and debugging (e.g. buffer usage and error history). This information can be retrieved from the bf3Net Engine 101 with API commands. Also, parameters can be changed through the API, allowing run-time profiling.

FIG. 2.B shows the layout of the bf3Net mxDmx network path descriptor, according to the present invention. The functional description of this path descriptor has already been given in the discussion of FIG. 2.A. The path descriptor consists of three bitfields (one for each layer of the bf3Net architecture), each with a variable length. Together the lengths of the bitfields for each layer must equal 8 or 16 bits.

FIG. 2.C shows the datalink architecture for Point-to-Point Protocol (PPP) connections in the bf3Net architecture, according to the present invention. The Frame Encapsulation functionality is implemented by the High Level Datalink Control module 302. The datalink multiplexer is implemented by the Point-to-Point Protocol (PPP) multiplexer 301.

A number of protocol modules can reside at this layer of the bf3Net architecture, according to the present invention, such as: Link Control Protocol (LCP), No authentication (AUTH), Password Authentication Protocol, Challenge Handshake Authentication Protocol (CHAP), Microsoft CHAP (MS-CHAP), and the Internet Protocol Control Protocol (IPCP).

FIG. 2.D shows the datalink architecture Ethernet connections in the bf3Net architecture, according to the present invention. The Frame Encapsulation functionality is implemented by the Ethernet Encapsulation module 402. The datalink multiplexer is implemented by the Ethernet multiplexer 401.

A number of protocol modules can reside at this layer of the bf3Net architecture, according to the present invention, such as: Address Resolution Protocol (ARP) 403, and Reverse Address Resolution Protocol (RARP) 404.

FIG. 3.A shows the general architecture of a bf3Scp Serial Communication Protocol session, according to the present invention. In the bf3Scp terminology, both sides of the communication session are referred to as implementations. A communication session consists of the exchange of messages and replies, according to a handshake definition.

The host implementation 101 consists of a graphical user-interface (GUI) program 103 that has access to a target database 104, and communicates with the target implementation through the built-in COM port 105 of the Personal Computer on which it runs.

The bf3Scp target implementation 102 consists of the target software 108 which communicates with the host implementation through the serial port 107 of the target processor on which it runs.

The RS232-to-TTL signal level conversion 106 is not regarded as part of either implementation, although because of to the bf3Scp signal definitions it must be provided. A cable which has been defined for this purpose will be described in the discussion of FIG. 3.F.

The target database 104 is provided to minimize the number of communication parameters that need to be configured to establish a communication session. It contains the parameters which are fixed at design-time. These parameters may also be stored in the GUI application, if this is more advantageous.

An overview of a user-interface application based on the bf3Scp architecture, according to the present invention, is shown in FIG. 3.B.

Enclosed by the dashed line are the elements of which the bf3Scp invention 201 consists:
 1. bf3Scp host protocol engine 202,
 2. bf3Scp target serial port driver 203,
 3. bf3Scp target protocol engine 204.

The bf3Scp host protocol engine 202 is an ActiveX object which handles all the protocol-related serial communication through the RS-232 COM port 205. It runs on any Microsoft Windows-compatible platform, and is independent of the host user-interface implementation 209. It comes in two versions: a local server which must run on the same host PC as the user-interface, or a remote server which can interact with the user-interface through a network, making use of Microsoft's DCOM technology.

The bf3Scp target serial port driver 203 handles physical layer communication through the Target serial port 207 on the target side. It must be developed for every processor that makes use of bf3Scp. For communication between the PC COM port 205 and the Target Serial Port 207, the RS-232-to-TTL level conversion 206 is required.

The bf3Scp target engine 204 is processor-independent; it handles all protocol-related communication on the target side which is not covered by the engine. It passes the received messages to the Custom Target application software 208 which must take appropriate action. With bf3Scp, the development of a custom user-interface for embedded target is limited to the following steps:
 1. Development of the Custom User-interface software 209,
 2. Definition of the target-specific message and reply codes,
 3. Sending messages to the target from the user-interface to the target through the bf3Scp host engine 202,
 4. Processing received messages on the target side by the Custom Target Application software 208.
 5. Sending a standard or custom reply 6. Processing the received reply in the Custom User-interface software 209.

This makes developing user-interfaces a straight-forward task. An application can optionally make use of the target database 210 (discussed in the context of FIG. 3.A).

FIG. 3.C shows the format 301 of the bf3Scp message, according to the present invention. The bf3Scp message consists of the following fields:

1. Fixed header (value 0xBF) 302
2. 4-bit sequence field SEQ 303
3. 4-bit flags field FLAGS 304
4. 1-bit sync field S 305
5. 7-bit length field LENGTH 306
6. 8-bit message type field MESSAGE 307
7. Byte-multiple payload 308
8. 8-bit frame checksum field FCS 309
9. Fixed trailer (value 0x03) 310

The fixed header 302, in combination with the LENGTH field 306, the FCS field 309, and the fixed trailer 310 make it simple for (embedded) applications to detect the end of a frame: if the accumulated sum of all received bytes equals '0', the last received byte is equal to 0x03, and the number of bytes received equals the value in the LENGTH field, the frame has been completely and correctly received.

The MESSAGE field 307 contains the qualification of the payload 308. Odd-numbered values represent messages, even-numbered values are reserved for replies. This also simplifies processing of incoming frames.

The SEQ field 303 is used to detect duplicate or out-of-order reception of messages and replies. Its value is incremented with each message sent (modulo-16) for a certain direction (target-host or host-target).

The FLAGS field 304 has a fixed value of 0×05. It is reserved for future applications.

The sync field S 305 is used for synchronization of the datalink. When its value is '1', the bf3Scp message is used for this purpose.

FIG. 3.D shows the synchronization procedure for a bf3Scp communication session, according to the present invention. The datalink is only (re)synchronized by the host implementation, thus simplifying the design of the target implementation.

A synchronization procedure starts by the sending of a SYNCREQ message 401 by the host to the target. The S field is set when this message is sent. The target must respond by sending a SYNCACK reply 402 (again with the S bit set) to the host. The host will acknowledge the reception of the SYNCACK reply 402, by sending an ACKNOWLEDGE 403 message (once more with the S bit set) to the target. This completes the synchronization procedure.

FIG. 3.E shows the handshake procedure for the exhange of messages and replies in a bf3Scp communication session, according to the present invention. Each implementation can send messages. The receiving implementation must always respond to the reception of a message according to the described handshake procedure.

A message transfer starts by the sending of a message 501 by implementation A to the implementation B. The S field is cleared when a normal message is sent. Implementation B must respond by sending a reply 502 (also with the S bit cleared) to implementation A, which will acknowledge the reception of the reply 502, by sending an ACKNOWLEDGE 503 message (once more with the S bit cleared) to the target. This completes the message transfer FIG. 3.F shows schematically the general mechanical design of a cable with integrated RS232-to-TTL level conversion.

The design consists of a 9-pin or 25-pin SUB-D type female connector 601, which plugs directly into the serial COM ports of personal computers. The connector is mounted on a printed circuit board (PCB) 606, which is small enough to fit into the enclosure of the connector 601.

The PCB 606 accomodates an integrated circuit 605 which provides the RS232-to-TTL level conversion, and a board-to-cable connector 604, which connects to a cable (e.g. a flat-cable) 603. On the other end of the cable 603, a cable socket connector is mounted.

What is claimed is:

1. A method of transferring generic data acquired at a remote location to a central database based on e-mail communication, the method comprising:
   (a) encapsulating the acquired data in an electronic mail message;
   (b) with a transfer device, sending the electronic mail through a public or private network to a central database server without use of gateway architecture by using an architecture for Internet communication software for embedded platforms, wherein the architecture for Internet communication software for embedded platforms is based on a network of software multiplexers and demultiplexers controlled by an integrated protocol engine;
   (c) extracting the data from the electronic mail message by the central database server;
   (d) storing the extracted data in the central database;
   (e) configuring the transfer device to receive another electronic mail message from a mailbox at the database server with POP3 protocol, wherein the other message contains configuration data; and
   (f) evaluating the other message and adjusting the locally stored configuration settings according to the other message,
   wherein the other message is communicated without use of a gateway architecture to the transfer device by using the architecture for Internet communication software for embedded platforms.

2. A device for transferring generic data acquired at a remote location to a central database based on e-mail communication, the device comprising:
   means for encapsulating the acquired data in an electronic mail message at the remote location;
   means for sending the electronic mail through a public or private network to a central database server,
   wherein the acquired data is communicated to the central database without use of gateway architecture, wherein the acquired data is communicated using an architecture for Internet communication software for embedded platforms, and wherein the architecture for Internet communication software for embedded platforms is based on a network of software multiplexers and demultiplexers controlled by an integrated protocol engine, and
   wherein the device is arranged to be configured by a database server interfacing with the central database, wherein the database server configures and manages the device according to a method comprising:
      configuring the device to receive another electronic mail message from a mailbox at the database server with POP3 protocol, wherein the other message contains configuration data; and
      evaluating the other message and adjusting the locally stored configuration settings according to the message, wherein the other message is communicated without use of a gateway architecture to the device by using the architecture for Internet communication software for embedded platforms.

3. A computer readable medium comprising instructions, which, when executed cause the computer to perform a method of transferring generic data acquired at a remote location to a central database based on e-mail communication, the method comprising:

extracting data from an electronic mail message sent with a transfer device;

storing the extracted data in the central database, wherein the acquired data is communicated to the database server without use of gateway architecture, wherein the acquired data is communicated using an architecture for Internet communication software for embedded platforms, and wherein the architecture for Internet communication software for embedded platforms is based on a network of software multiplexers and demultiplexers controlled by an integrated protocol engine;

configuring the transfer device to receive another electronic mail message from a mailbox at the database server with POP3 protocol, wherein the other message contains configuration data; and evaluating the other message and adjusting the locally stored configuration settings according to the other message, wherein the other message is communicated without use of a gateway architecture to the transfer device by using the architecture for Internet communication software for embedded platforms.

* * * * *

UNITED STATES PATENT AND TRADEMARK OFFICE
CERTIFICATE OF CORRECTION

PATENT NO.      : 7,624,148 B2
APPLICATION NO. : 10/785420
DATED           : November 24, 2009
INVENTOR(S)     : Rutger van Dalen Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1322 days.

Signed and Sealed this

Twenty-sixth Day of October, 2010

David J. Kappos
*Director of the United States Patent and Trademark Office*